US012765969B1

(12) United States Patent
Hilgers et al.

(10) Patent No.: US 12,765,969 B1
(45) Date of Patent: Oct. 20, 2026

(54) DENTAL RETAINER

(71) Applicants: James J. Hilgers, Bonsall, CA (US); Shannon L. Nissen, Bonsall, CA (US)

(72) Inventors: James J. Hilgers, Bonsall, CA (US); Shannon L. Nissen, Bonsall, CA (US)

( * ) Notice: Subject to any disclaimer, the term of this patent is extended or adjusted under 35 U.S.C. 154(b) by 525 days.

(21) Appl. No.: 18/119,243

(22) Filed: Mar. 8, 2023

(51) Int. Cl.

| | |
|---|---|
| ***A61C 7/08*** | (2006.01) |
| ***A61C 7/14*** | (2006.01) |
| ***A61C 7/22*** | (2006.01) |
| ***A61C 13/00*** | (2006.01) |

(52) U.S. Cl.
CPC .................. *A61C 7/08* (2013.01); *A61C 7/14* (2013.01); *A61C 7/22* (2013.01); *A61C 13/0019* (2013.01)

(58) Field of Classification Search
CPC .... A61C 7/20; A61C 7/28; A61C 7/12; A61C 7/10; A61C 7/145; A61C 7/00; A61C 7/282; A61C 7/285; A61C 7/287; A61C 7/34; A61C 7/08; A61C 7/14; A61C 7/22; A61C 13/0019
USPC .............................................................. 433/6
See application file for complete search history.

(56) References Cited

U.S. PATENT DOCUMENTS 3,921,295 A * 11/1975 James ...................... A61C 7/22 433/21
4,571,179 A * 2/1986 Balenseifen ............. A61C 7/00 433/22
4,897,035 A * 1/1990 Green .................... A61C 7/282 433/17
5,120,218 A * 6/1992 Hanson .................... A61C 7/36 433/19
5,356,288 A * 10/1994 Cohen .................... A61C 7/282 433/10
5,816,799 A * 10/1998 Parker ...................... A61C 7/10 128/848
6,183,250 B1 * 2/2001 Kanno ..................... A61C 7/28 433/17
7,141,207 B2 11/2006 Jandeska, Jr. et al.
8,502,107 B2 8/2013 Uckelmann
10,179,035 B2 1/2019 Shivapuja et al.
10,737,326 B2 8/2020 Kaneko
10,966,802 B2 4/2021 Ruetschi et al.
11,014,150 B2 5/2021 Cho
(Continued)

FOREIGN PATENT DOCUMENTS

WO WO-2008045937 A1 * 4/2008 ............... A61C 7/00

*Primary Examiner* — Matthew M Nelson
(74) *Attorney, Agent, or Firm* — Cramer Patent & Design, PLLC.; Aaron R. Cramer

(57) ABSTRACT

The present invention is directed to a dental retainer. The dental retainer may comprise a retainer wire, a left bracket (or receptacle) and a right bracket (or receptacle) placed on the lower lingual side of the lower incisor teeth. The dental wire may be adapted to hold the lower teeth of a patient in place after the patient has undergone a procedure to realign the teeth. The lingual side if the left bracket may be adapted to couple to the lingual side of the bracket on lower right cuspid. The retainer wire may detachably couple to the left bracket and the right bracket such that the retainer wire is adapted to press against the lingual side of the lower incisors to retain the lower incisors in position. The retainer wire may be adapted to be removed and replaced in to clean the teeth, further adapt the wire, and be replaced for continued use. The retainer wire may be manufactured using a 3D printer.

2 Claims, 3 Drawing Sheets

(56) References Cited

U.S. PATENT DOCUMENTS

| | | | | |
|---|---|---|---|---|
| 11,123,164 | B2 | 9/2021 | Sarig | |
| 11,198,178 | B2 | 12/2021 | Xu et al. | |
| 11,239,422 | B2 | 2/2022 | McAlpine et al. | |
| 11,324,572 | B2 * | 5/2022 | Roein Peikar | A61C 7/10 |
| 2010/0129766 | A1 * | 5/2010 | Hilgers | A61C 7/00 433/21 |
| 2011/0129785 | A1 * | 6/2011 | Cohen | A61C 7/36 433/18 |
| 2014/0302448 | A1 * | 10/2014 | Cassalia | A61C 7/20 433/20 |
| 2014/0335468 | A1 * | 11/2014 | Dickerson | A61C 7/20 433/19 |
| 2015/0335398 | A1 * | 11/2015 | Rosenthall | A61C 7/145 433/24 |
| 2016/0302890 | A1 * | 10/2016 | Hamilton | A61C 7/00 |
| 2017/0112596 | A1 * | 4/2017 | Entrup | A61C 7/28 |
| 2017/0156823 | A1 * | 6/2017 | Roein Peikar | A61C 7/28 |
| 2018/0014916 | A1 * | 1/2018 | Cinader, Jr. | A61C 7/146 |
| 2018/0303583 | A1 * | 10/2018 | Tong | A61C 7/146 |
| 2019/0209269 | A1 * | 7/2019 | Gualano | A61C 7/145 |
| 2019/0262102 | A1 * | 8/2019 | Haralambidis | A61C 7/08 |
| 2020/0155277 | A1 * | 5/2020 | Clark | A61C 7/10 |
| 2020/0197133 | A1 * | 6/2020 | Hirsch | B29C 64/10 |
| 2021/0353389 | A1 * | 11/2021 | Roein Peikar | A61C 7/20 |
| 2022/0133439 | A1 * | 5/2022 | Moghanchi | A61C 7/16 433/16 |
| 2022/0287804 | A1 * | 9/2022 | Oda | A61C 7/02 |
| 2023/0100466 | A1 * | 3/2023 | Huynh | A61C 7/20 433/20 |
| 2024/0225786 | A1 * | 7/2024 | Kim | A61C 9/00 |

* cited by examiner

DENTAL RETAINER

RELATED APPLICATIONS

Non-applicable.

FIELD OF THE INVENTION

The present invention relates to a dental retainer and more specifically a wire/bracket combination that may be preformed or 3D printed for lingual orthodontic retainers capable of being inserted and removed by a dentist in a manner which is easier than a wire permanently fixed with dental composites. Since this is intended to be a long-term retention method, the easy removal and replacement of the retention wire to facilitate teeth cleanings and wire adjustments by the dentist or dental hygienist is highly desirable.

BACKGROUND OF THE INVENTION

Orthodontic treatment is a common way to straighten teeth and improve the bite a using braces and/or removable aligners. Fixed lingual retention is a technique in which a wire is bonded on the inside (lingual) surface of the teeth, rather than the outside (buccal) surface. This wire is intended to be permanent and cannot be removed without grinding away the attachment composite. This technique is popular because it is less visible than traditional removable retainers. However, fixed lingual retainers can be more challenging and time-consuming to place and remove and more susceptible to breakage and failure over time.

Currently, lingual orthodontic retainers are typically made using a wire which is directly bonded to the teeth using a covering of dental adhesive. Removing this wire can be difficult and can damage the tooth enamel during the process. Additionally, the process of placing and removing fixed bonded lingual retainers can be time consuming, especially when broken, and can be an inconvenience for the dentist and patient.

There is a need for a lingual dental retainer wire that is more easily removed and reinserted by dentists than wires that are permanently attached to the teeth with dental composites. The present device provides for a lingual orthodontic retainer wire that is either robotically bent or 3D printed and two receptacle brackets, so that the wire is easily inserted and removed by a dentist or hygienist providing a more thorough, efficient and comfortable experience during teeth cleanings and wire adjustments.

This design reduces the need for the covering dental adhesive and makes the insertion and removal process less time-consuming and less damaging to the tooth enamel. Additionally, this embodiment, being either preformed or 3D printed, enables more accurate and precise customization for each patient's unique dental needs. As a consequence, the use of the dental retainer addresses the aforementioned issues in a manner that is effective and efficient.

SUMMARY OF THE INVENTION

To achieve the above and other objectives, the present invention provides for a dental retainer that may be 3D printed that comprises three main components: a retainer wire, a left bracket, and a right bracket. The retainer wire has a left retention loop and a right retention loop that are parallel to a flat surface of the lower left and lower right cuspid respectively. The left bracket and right bracket have a base, center post and trough, and are adapted to couple to the lingual side of the lower left cuspid and lower right cuspid. The retainer wire is removable for cleaning and can include laser engraving for serial numbers for repair or identification.

The retention loops are circular in shape and flattened to reduce thickness in a direction of the central axis, which is perpendicular to the flat surface of the cuspids. The retainer wire can be made from materials such as cobalt-chromium alloy, titanium alloy or stainless steel. The bracket bases are circular disks with side walls, a back and a slot such that the retainer wire exits the bracket, and center posts that extend away from the rear of the bases. The brackets are also adapted to couple to the cuspids.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
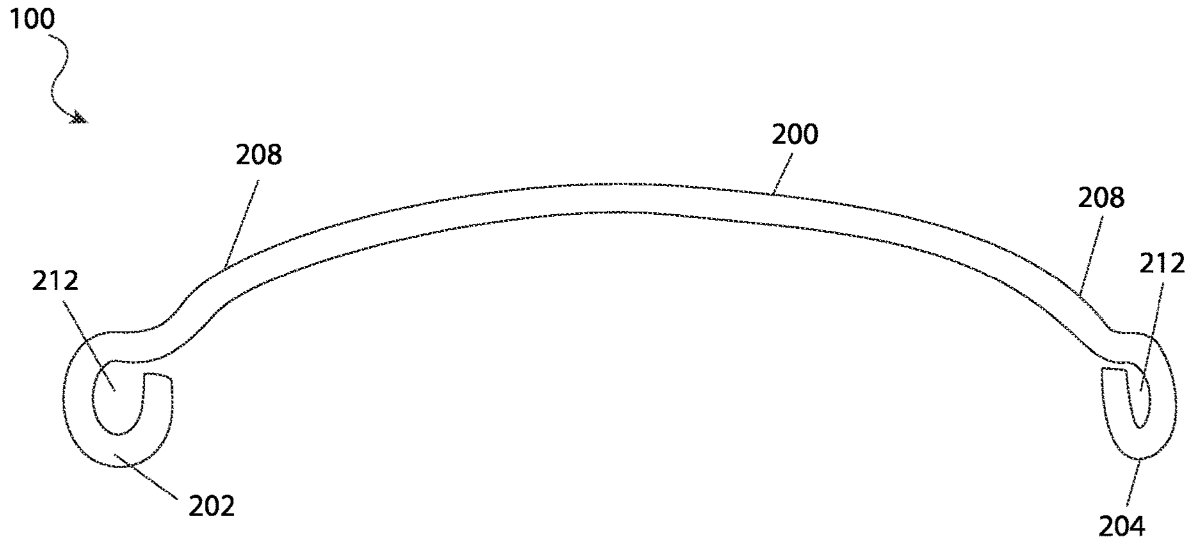
FIG. 1 is an isometric view of a dental retainer, according to an embodiment of the present invention, illustrating the wire.
Figure 2:
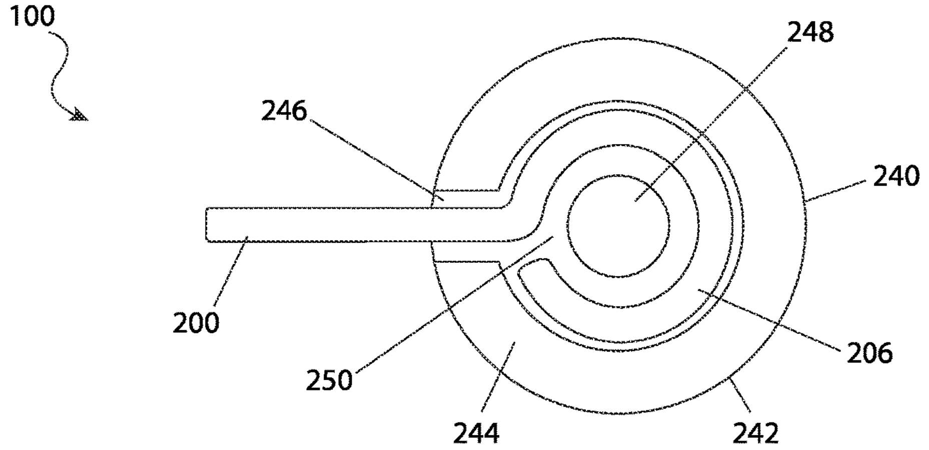
FIG. 2 is a detail view of a dental retainer, according to an embodiment of the present invention, illustrating an individual bracket with the open loop coupled.
Figure 3:
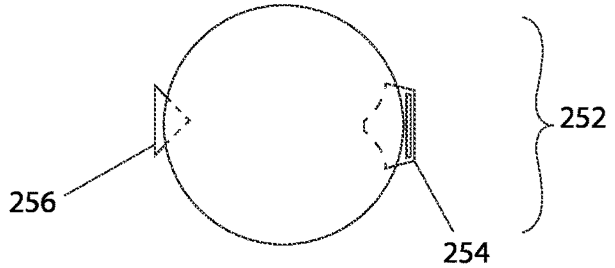
FIG. 3 is a detail view of a dental retainer, according to an embodiment of the present invention, illustrating a door.
Figure 4:
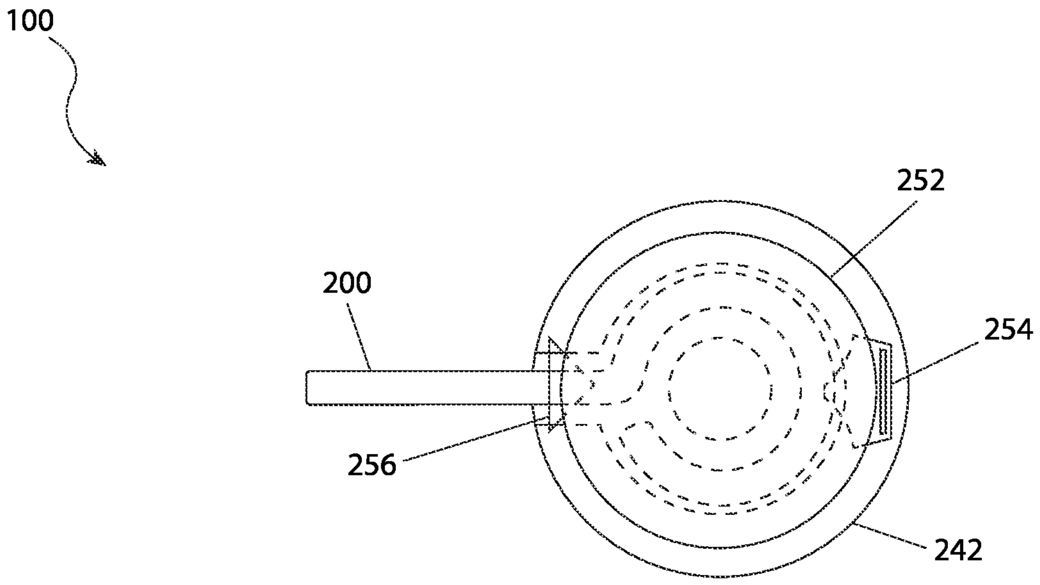
FIG. 4 is a detail view of a dental retainer, according to an embodiment of the present invention, illustrating a door in the closed position.
Figure 5:
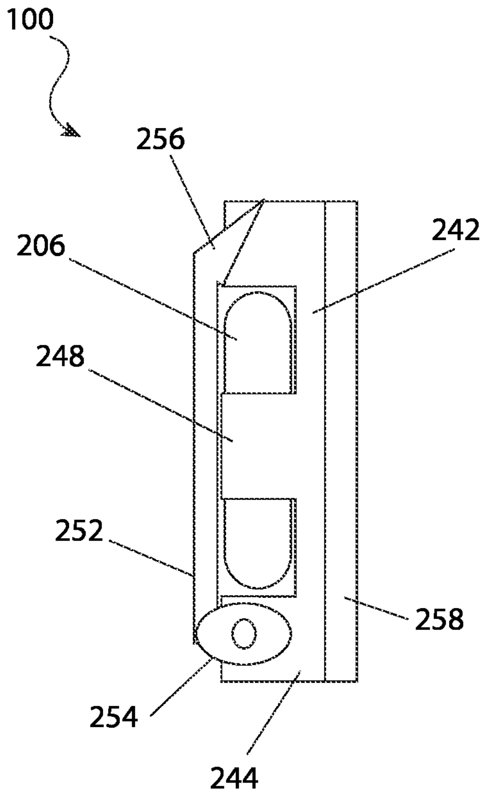
FIG. 5 is a cross-sectional view of a dental retainer, according to an embodiment of the present invention, illustrating a door in the closed position.
Figure 6:
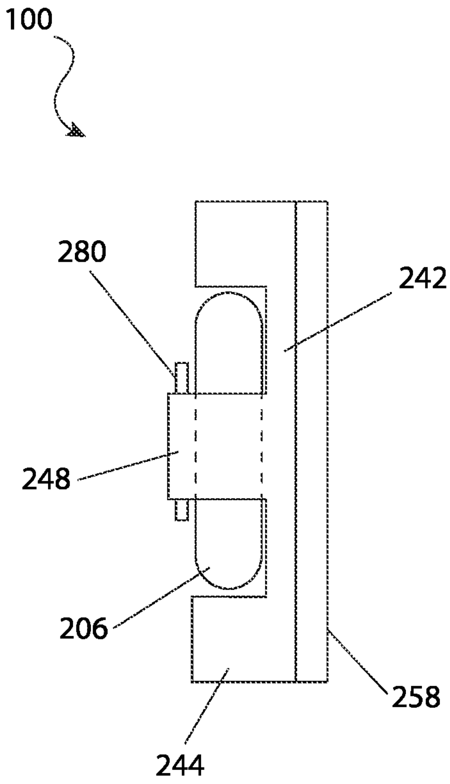
FIG. 6 is a cross-sectional view of a dental retainer, according to an embodiment of the present invention, illustrating a post clip.
Figure 7:
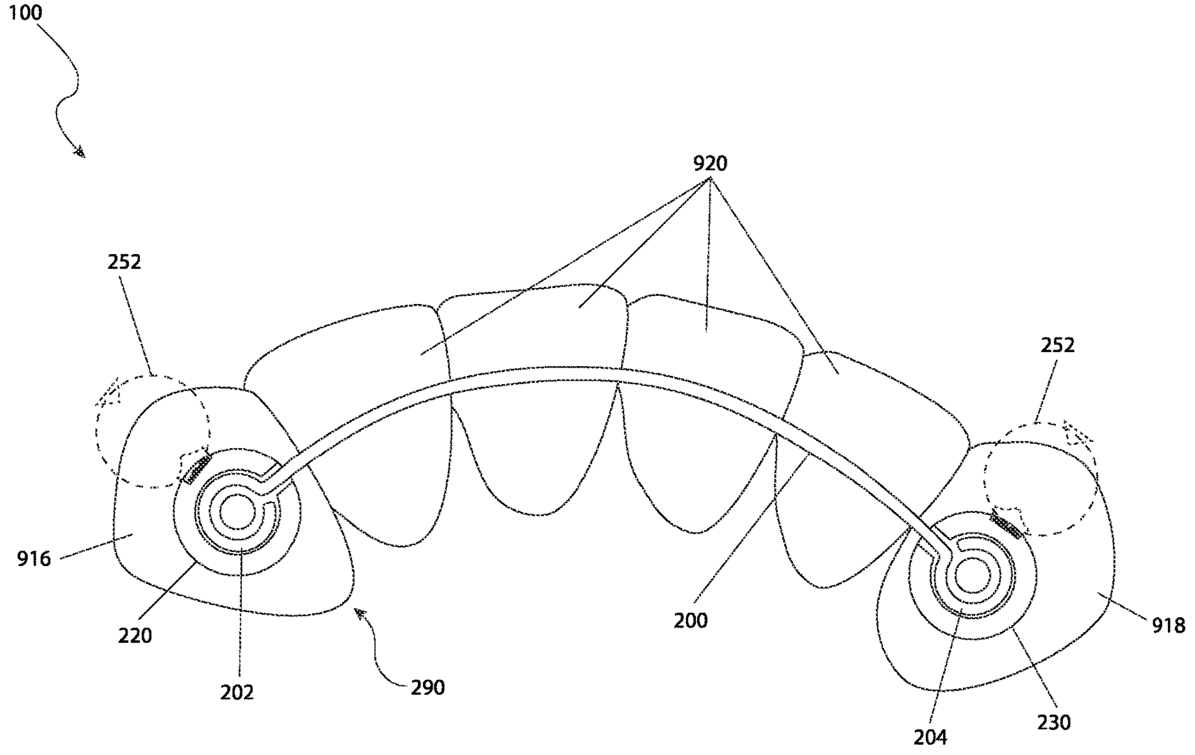
FIG. 7 is an in-use view of a dental retainer, according to an embodiment of the present invention.

100 lower lingual dental retainer
200 retainer wire (removable)
202 left retention loop
204 right retention loop
206 retention loop in situ
208 gables
212 central aperture
220 left bracket (receptacle)
230 right bracket (receptacle)
240 individual bracket
242 bracket base
244 side wall of bracket
246 circular slot
248 center post
250 trough
252 locking door
254 hinge
256 locking clip
258 mesh bonding pad
280 post clip (alternative locking mechanism)
290 lingual view of cuspid
916 lower left cuspid
918 lower right cuspid
920 lingual view of lower incisors

1. Description of the Invention

The present invention is directed to a dental retainer (herein described as the "invention") 100. The invention 100 may comprise a retainer wire 200, a left bracket 220, and a right bracket 230. The invention 100 may be adapted to hold the lower teeth of a patient in place after the patient has undergone a procedure to realign the teeth. The left bracket 220 may be adapted to couple to the lingual side 290 of the lower left cuspid 916 and the right bracket 230 may be adapted to couple to the lingual side 290 of the lower right cuspid 918. The retainer wire 200 may detachably couple to the left bracket 220 and to the right bracket 230 such that the retainer wire 200 is adapted to press against the lingual side 290 of the lower incisors 920 to retain the lower incisors 920 in position. The retainer wire 200 may be adapted to be removed in order to clean the teeth or further adapt the retainer wire 200, the left bracket 220, and the right bracket 230.

The retainer wire 200 may be curved to match the contour of the lingual side 290 of the lower teeth. The retainer wire 200 may comprise a left retention loop 202 and a right retention loop 204. The left retention loop 202 may be the left terminus of the retainer wire 200 and the right retention loop 204 may be the right terminus of the retainer wire 200. The left retention loop 202 may be adapted to be parallel to the flat surface of the lower left cuspid 916. The right retention loop 204 may be adapted to be parallel to the flat surface of the lower right cuspid 918.

An individual retention loop selected from the right retention loop 204 and the left retention loop 202 may be an open loop 206 that is circular in shape. The individual retention loop may be sized to detachably couple to the left bracket 220 and to the right bracket 230. The individual retention loop may define a central axis that may pass through the center of the individual retention loop and may be oriented to be perpendicular to the plane of the individual retention loop. The central axis may be adapted to be perpendicular to the flat surface of the lingual side 290 of the individual cuspid where the individual retention loop attaches. The individual retention loop may define a central aperture 212 which may be operable to couple to an individual bracket 240 selected from the left bracket 220 and the right bracket 230.

In some embodiments, the left retention loop 202 and the right retention loop 204 may be flattened to reduce the overall height profile at the ends of the retainer wire 200. The flattening may be oriented to reduce the thickness of the individual retention loops in the direction of the central axis. Flattening the individual retention loops may enable the height of the left bracket 220 and the right bracket 230, as measured 25 perpendicular to the individual cuspid, to be reduced.

In some embodiments, the retainer wire 200 may comprise gables 208 located at cuspid-lateral embrasures. The gables 208 may be bends in the retainer wire 200 such that the retainer wire 200 is adapted to increase the pressure applied to the lingual side 290 of the lower incisors 920 between the gables 208.

The retainer wire 200 may be made from a material that is typically used for orthodontic wires. As non-limiting examples, the retainer wire 200 may be made from cobalt-chromium alloys, titanium alloys, or stainless steel.

In some embodiments, the retainer wire 200 may comprise laser engraving. As a non-limiting example, the laser engraving may comprise a serial number that may be useful for purposes of repair or forensic identification.

The left bracket 220 may be adapted to couple to the lingual side 290 of the lower left cuspid 916 and the right bracket 230 may be adapted to couple to the lingual side 290 of the lower right cuspid 918. As a non-limiting example, the left bracket 220 and the right bracket 230 may be bonded to the lower cuspids via bonding pads 258.

The left bracket 220 may be adapted to couple to the lingual side 290 10 of the lower left cuspid 916 and the right bracket 230 may be adapted to couple to the lingual side 290 of the lower right cuspid 918. As a non-limiting example, the left bracket 220 and the right bracket 230 may be bonded to the lower cuspids via bonding pads 258.

The individual bracket 240 may comprise a base 242, a center post 248, and a trough 250. The individual retention loop may detachably couple to the individual bracket 240 when the individual retention loop is seated into the trough 250 with the center post 248 passing through the central aperture 212 of the individual retention loop.

In some embodiments, the open loop 206 may be retained on the 10 individual bracket 240 by a post clip 280 that may removably couple directly to the center post 248.

The base 242 may be a circular disk comprising a side wall 244. The back of the base 242 may be adapted to couple to the individual cuspid. The side wall 244 may surround the individual retention loop when the retainer wire 200 is coupled to the individual bracket 240. The side wall 244 may comprise a slot 246 such that the retainer wire 200 may exit the individual bracket 240.

The center post 248 may extend away from the rear of the base 242 from the center of the base 242. The open space between the center post 248 and the side wall 244 may define the trough 250.

In some embodiments, the rear of the individual bracket 240 may be covered by a door 252. The door 252 may be moved to a closed position to prevent food from adhering to the individual bracket 240 and to the individual retention loop. The door 252 may 230 in the open position, the retainer wire 200 may be coupled to the left bracket 220 and to the right bracket 230 by pressing the open loops 206 into place within the troughs 250. The doors 252 may then be moved to the closed position. Another embodiment of the retention of the loops in the bracket may be by virtue of a locking mechanism (with no door) 280.

The door 252 may comprise a hinge 254 and a clip 256 which may be located on opposite sides of the door 252. The hinge 254 may pivotably couple the door 252 to the base 242. The clip 256 may be operable to retain the door 252 in the closed position unless an external opening force is applied to the clip.

In some embodiments, the open loop 206 may be retained on the 10 individual bracket 240 by a post clip 280 that may removably couple directly to the center post 248.

In some embodiments, the individual bracket 240 may be adapted to be bonded to the individual cuspid via the bonding pad 258 located between the individual bracket 240 and the individual cuspid. As a non-limiting example, the bonding pad 258 may comprise a stainless steel foil mesh.

In some embodiments, the retainer wire 200 may be adapted to be 3D printed by a metal 3D printer located in a dentist's office. A dentist may scan the inside of a patient's mouth to create a scan file that describes at least the contours of the lingual side 290 of the lower teeth. The dentist may transmit the scan file to a vendor. The vendor may process the scan file using vendor software to produce a digital file describing a 3D model of the retainer wire 200. As a non-limiting example, the digital file may be an STL file. The digital file may be transmitted back to the dentist's office and sent to the metal 3D printer which may produce the retainer wire 200. Advantages of this approach may comprise quick (possibly same day) acquisition of the retainer wire 200 and rapid replacement of the retainer wire 200 if the retainer wire 200 breaks or otherwise requires replacement.

In use, the left bracket 220 may be coupled to the lingual side 290 of 30 the lower left cuspid 916 and the right bracket 230 may be coupled to the lingual side 290 of the lower right cuspid 918. With the doors 252 on the left bracket and the right bracket 230 in the open position, the retainer wire 200 may be coupled to the left bracket 220 and to the right bracket 230 by pressing the open loops 206 into place within the troughs 250. The doors 252 may then be moved to the closed position.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A dental retainer comprising:

a retainer wire comprising a left retention loop and a right retention loop;

a left bracket adapted to couple to a lingual side of a lower left cuspid; and, a right bracket adapted to couple to a lingual side of a lower right cuspid; and, wherein each bracket comprises a base, a center post extending from the base, and a trough defined between the center post and a side wall of the base;

wherein each bracket further comprises a door pivotably coupled to the base by a hinge, the door being movable between an open position and a closed position;

wherein the left retention loop is adapted to couple to the left bracket and the right retention loop is adapted to couple to the right bracket by seating each retention loop into the trough of its corresponding bracket with the center post passing through a central aperture of the retention loop; and, wherein each side wall surrounds its corresponding retention loop and comprises a slot through which the retainer wire exits the bracket, when the retention loop is coupled to the bracket.

2. The dental retainer of claim 1, wherein the door comprises a hinge on a first side and a locking clip on a second, opposite side, the locking clip being operable to retain the door in the closed position.

* * * * *